US007754283B2

(12) United States Patent
Schneider et al.

(10) Patent No.: US 7,754,283 B2
(45) Date of Patent: Jul. 13, 2010

(54) CONTINUOUS PRODUCTION OF CARBON NANOTUBES

(75) Inventors: Juan Schneider, Laval (CA); Gilles Picard, Trois-Rivières (CA)

(73) Assignee: Nanometrix Inc., Montreal, Quebec (CA)

( * ) Notice: Subject to any disclaimer, the term of this patent is extended or adjusted under 35 U.S.C. 154(b) by 554 days.

(21) Appl. No.: 10/584,156

(22) PCT Filed: Dec. 22, 2004

(86) PCT No.: PCT/CA2004/002179

§ 371 (c)(1),
(2), (4) Date: Jun. 22, 2006

(87) PCT Pub. No.: WO2005/061382

PCT Pub. Date: Jul. 7, 2005

(65) Prior Publication Data

US 2007/0140947 A1 Jun. 21, 2007

(51) Int. Cl.
*C23C 16/00* (2006.01)
(52) U.S. Cl. .............. 427/249.1; 427/249.3; 427/249.9; 977/742; 977/775
(58) Field of Classification Search .............. 427/249.1, 427/249.3, 249.9; 977/942, 742, 775
See application file for complete search history.

(56) References Cited

U.S. PATENT DOCUMENTS

| 6,616,986 B2 | 9/2003 | Sherman | |
| 6,887,451 B2 * | 5/2005 | Dodelet et al. | 423/447.3 |
| 2002/0150524 A1 | 10/2002 | Smalley et al. | |
| 2003/0082094 A1 * | 5/2003 | Loutfy et al. | 423/447.3 |
| 2003/0111334 A1 * | 6/2003 | Dodelet et al. | 204/164 |
| 2003/0148097 A1 * | 8/2003 | Takikawa et al. | 428/364 |
| 2003/0188963 A1 * | 10/2003 | Takikawa et al. | 204/164 |
| 2003/0211030 A1 | 11/2003 | Olivier et al. | |
| 2004/0036403 A1 | 2/2004 | Ono et al. | |

FOREIGN PATENT DOCUMENTS

| EP | 678 345 A1 | 10/1995 |
| EP | 1 096 533 A1 | 5/2001 |
| WO | WO 99/06618 | 2/1999 |
| WO | WO 99/25652 | 5/1999 |
| WO | WO 01/89716 A2 | 11/2001 |
| WO | WO 02/081366 A1 | 10/2002 |

OTHER PUBLICATIONS

Wikipedia, "Transmission Electron Microscopy", http://en.wikipedia.org/wiki/Transmission_electron_microscope.*
W. Z. Li et al., Large-Scale Synthesis of Aligned Carbon Nanotubes, Science, vol. 274, Dec. 6, 1996, pp. 1701-1703.
O. Smiljanic et al., Growth of Carbon Nanotubes on Ohmically Heated Carbon Paper, Chemical Physics Letters, 342, 2001, pp. 503-509.

* cited by examiner

*Primary Examiner*—Binh X Tran
(74) *Attorney, Agent, or Firm*—Ogilvy Renault LLP

(57) ABSTRACT

The invention relates to a nanoparticle growing mat (30), a method of manufacturing the mat, and a method for the continuous production of organized nanotubes using the mat. The mat (30) comprising a substrate including carbon, on which is deposited in a predetermined pattern of nanosized catalytic particles whose pattern produces nanotubes in a highly ordered form. The mat (30) is activated in the presence of a carrier gas, by passing current through the mat (30) which raises the temperature to the level where, nanotubes are: formed; gathered; withdrawn as nanotube bundles (42); and collected.

38 Claims, 2 Drawing Sheets

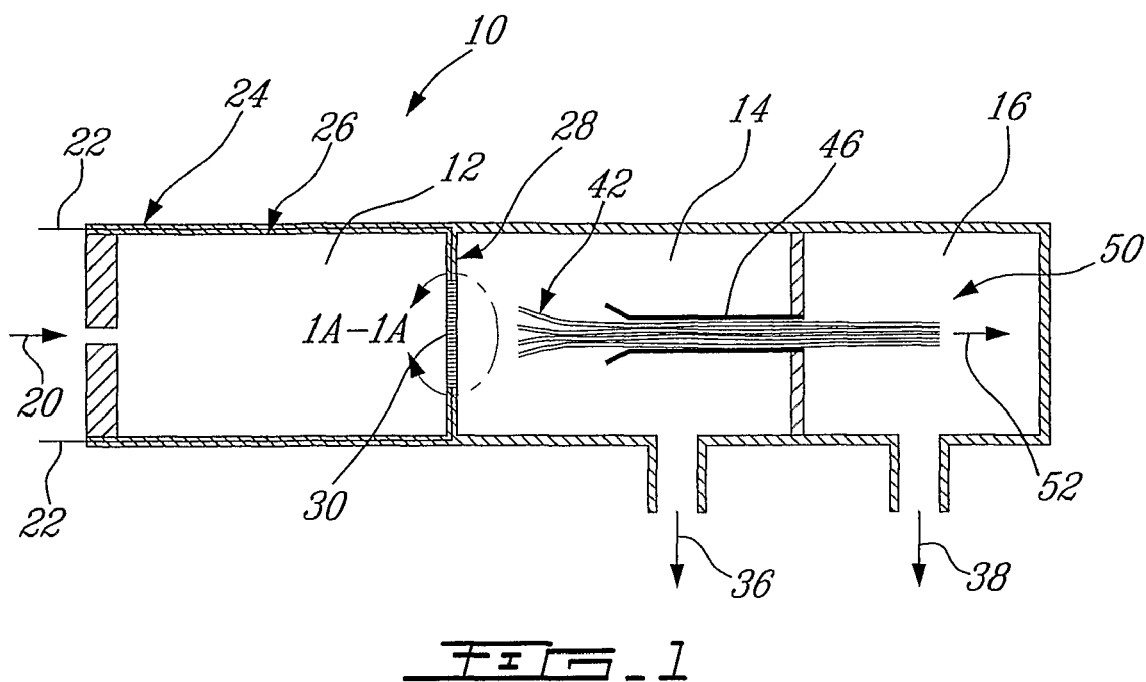
FIG_1
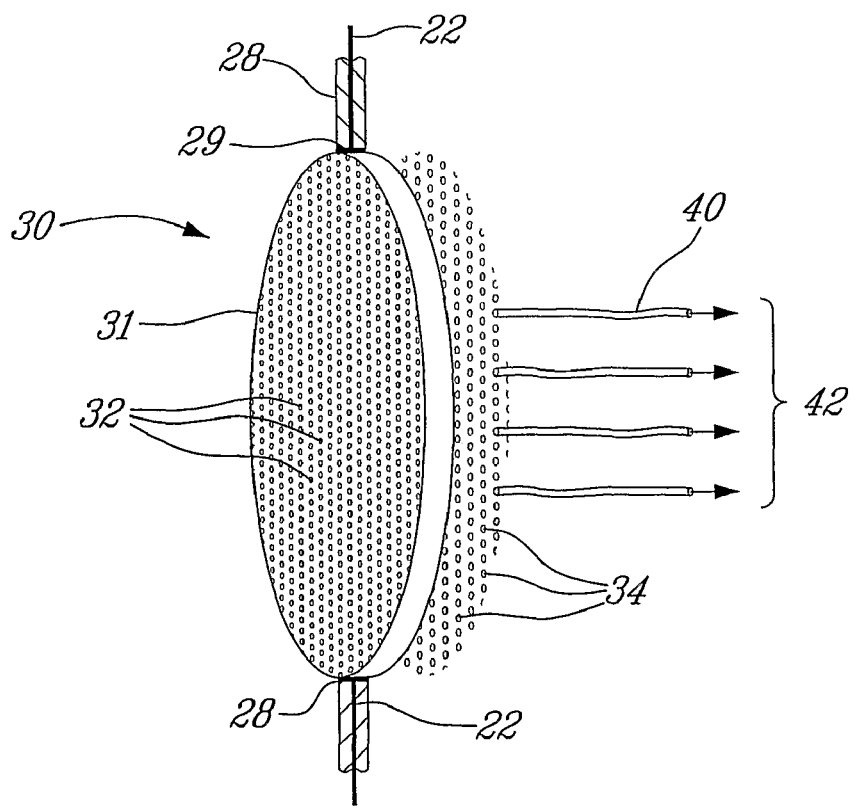
FIG_1A

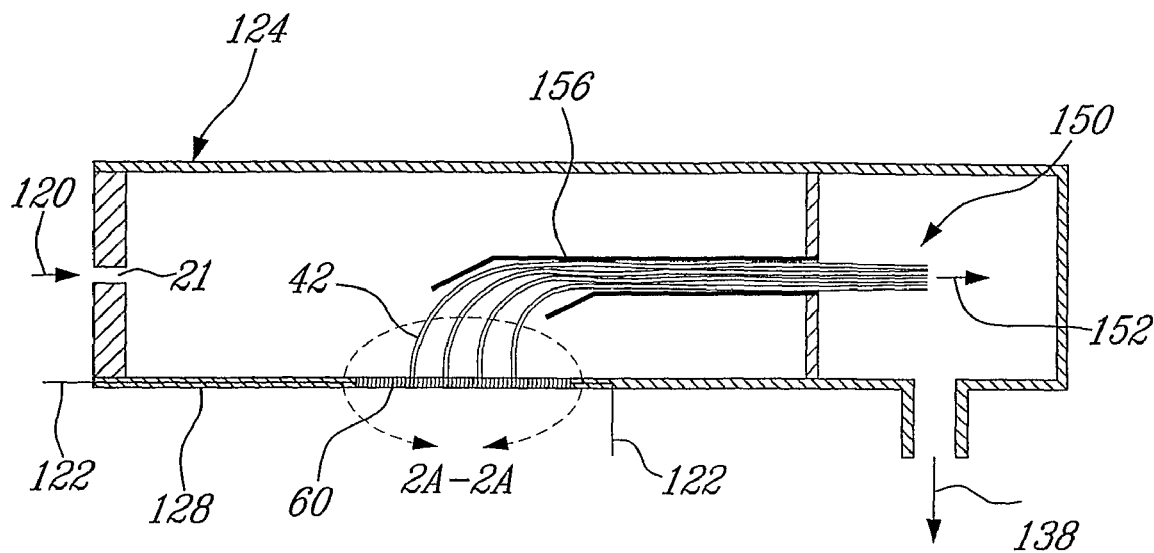
FIG_2
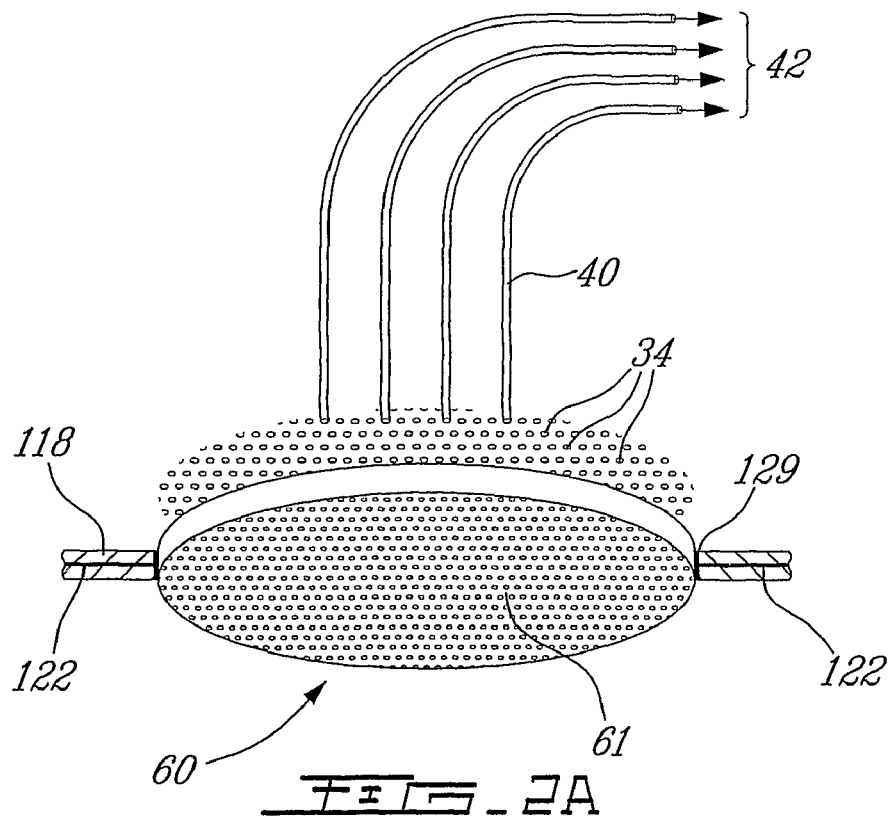
FIG_2A

CONTINUOUS PRODUCTION OF CARBON NANOTUBES

BACKGROUND OF THE INVENTION

1. Technical Field

This invention generally relates to a process and a new nanotube growing mat on which nanotubes are grown in an organized and continuous manner and from where nanotubes, nanofibers, filaments, wires, cables and the like can also be produced.

2. Description of the Prior Art

There has been a great deal of scientific and commercial interest in carbon nanotubes in the last ten (10) years. Single Wall Carbon Nanotubes (SWCNT)and Multi-Wall Carbon Nanotubes (MW CNT) have what appear to be interesting commercial applications. The physical, electrical and optical properties of carbon nanotubes are in large part the reason for this interest.

Nanotubes can be produced by a variety of methods that include: laser ablation; electric-arc ablation; carbon vapour deposition and a reaction with a catalyst-carbon-paper.

In laser and electric-arc ablation graphite enriched with a metallic catalyst is evaporated, with the vapour produced condensed into nanotubes, these methods both require large amounts of energy. Carbon vapour deposition (CVD) by contrast requires approximately three (3) times less energy than either laser or electric-arc ablation.

In carbon vapour deposition the entire reactor is heated, yet CVD produces low yields and generates large quantities of amorphous carbon during pyrolysis.

Catalyst-carbon paper method uses a different approach, catalytic nanoparticles are deposited randomly on a random carbon substrate but only the carbon paper substrate is heated. US Patent Application 2003/0111334 A1 by Dodelet et al., teaches a method of carbon vapour deposition capable of producing carbon nanotubes in the absence of amorphous carbon at a low temperature. However, Dodelet et al, produce an intertwined mat of nanofibers. Similarly, in, "Growth of carbon nanotubes on Ohmically heated carbon paper" by Smiljanic et al, *Chemical Physics Letters,* 342(2001) pages 503-509, describes a method and apparatus for the production of nanotubes from a catalyst deposited on a porous carbon paper. Once again, the nanotubes or nanofibers produced are found in an entangled mat and difficult to separate. Furthermore, their production is intermittent and limited to about one minute of operation.

At present individual single or individual multi-wall nanotubes and nanofibers are produced in short strands varying from micrometer to millimeter lengths. Some production methods have little control of the nanotube length and the nature of the nanotubes, due in part to Van der Waals repulsive forces. Most frequently nanotubes are produced in an intertwined mat of short strands which are difficult to harvest. During any harvesting, there is a relatively large loss of nanotubes because of breakage and due to an inability to remove the nanotubes from the substrate on which they are produced.

The four methods of laser ablation; electric-arc ablation; carbon vapour deposition and catalyst-carbon paper reaction, are not meant to produce an ordered assembly of nanoparticles.

SUMMARY OF THE INVENTION

It is an object of the invention to provide a method of producing an ordered assembly of nanotubes. It is another object of the invention to produce this organized assembly of nanotubes on a continuous basis.

In accordance with one embodiment of the invention there is provided a method of manufacturing a nanotube growing mat comprising: providing a substrate including carbon; applying nanosized catalytic particles on the substrate in a predetermined pattern, the pattern promoting growth in an organized manner from the catalyst as a function of the pattern.

In accordance with another embodiment of the invention there is provided a method of producing organized nanotubes comprising: preparing a nanotube growing mat comprising: a substrate including carbon; nanosized catalytic particles on the substrate, wherein the catalytic particles are applied in a predetermined pattern on the substrate, the pattern promoting growth of nanotubes in an organized manner which is a function of the pattern; activating the mat; and flowing a carrier gas in a direction whereby the nanotubes are produced from the mat on a continuous basis.

It is a further object of the invention to provide a new nanotube growing mat for producing an organized assembly of carbon nanotubes on a continuous basis.

In accordance with a further embodiment of the invention there is provided a nanotube growing mat comprising a substrate including carbon; nanosized catalytic particles, wherein the set is applied on the substrate in a predetermined pattern which promotes growth of nanotubes from the catalytic particles as a function of the pattern.

BRIEF DESCRIPTION OF THE DRAWINGS

Further features and advantages of the present invention will become apparent from the following detailed description, taken in combination with the appended drawings, in which:

FIG. 1. is a schematic diagram of a reactor in which a nanotube growing mat in mounted in accordance with one embodiment of the present invention the mat being oriented: perpendicularly to the flow of the carrier gas; and includes an ordered nanoparticle catalyst; connected to electrodes, and a means for gathering and withdrawing the carbon nanotubes formed;

FIG. 1A. is an exploded perspective view of the nanotube growing mat mounted adjacent the cross section of the retaining wall, the mat including a porous carbon substrate, an organized catalyst, a seal, the nanotubes produced and the nanotube bundle produced on the catalyst at the substrate;

FIG. 2. is a schematic diagram of a reactor in which the nanotube growing mat is mounted in accordance with a further embodiment of the invention: in parallel with the flow of the carrier gas; and includes an organized nanoparticle catalyst; connected to electrodes, and a means for gathering and withdrawing the carbon nanotubes formed; and FIG. 2a is an exploded perspective view of the nanotube growing mat mounted adjacent the cross section of the retaining wall, the mat including a porous carbon substrate, an organized catalyst, a seal, the nanotubes produced and the nanotube bundle produced on the catalyst at the substrate.

DETAILED DESCRIPTION OF THE PREFERRED EMBODIMENT

One preferred apparatus used to produced nanotubes by the method of this invention is presented in FIG. 1.

The apparatus includes a compartmentalized vessel 10. The vessel 10 may contain two or more compartments, in this case the compartments are 12, 14 and 16. The first compartment 12 includes an inlet 20 for a carrier gas 21, electrically and thermally insulated walls 24 and 26, and a nanotube growing mat 30 which includes a porous substrate 31. The mat 30 is held in a retaining wall 28 of the first compartment 12. This retaining wall 28 further contains electrical electrodes 22 connected to the substrate 31. The nanotube growing mat 30 is principally a bi-dimensionally. organized monolayer 34 of nanosized catalytic particles or also called an ordered set of nanoparticle catalyst. The catalytic particles uniformity in shape and size, and the monolayer organization are important for the production of carbon nanotubes bundles.

This monolayer 34 is supported by a second layer where its uniformity is also critical for the quality of the carbon nanotubes bundle production. Different methods allow the preparation of the supporting layer, such as Carbon Vacuum Evaporation (used in a standard way as a substrate for Transmission Electron Microscopy of proteins, as an example) on top of a two dimensional array matrix made of, as example, silicate nanoparticles. These supporting matrixes can be made of self-standing two dimensional arrays of particles, or by a surface patterned using monolayer generator 1 (MG1) method, as described in PCT/CA03/00697 filed on May 12, 2003, which is hereby incorporated by reference. Lithographic methods, can also be envisaged for this deposition.

Nanoparticles of metal oxide are deposited on top of a uniform surface by different methods, such as MG1, Langmuir-Blodgett, etc. and further reduced to metal. The methods of MG1, Langmuir-Blodgett, other apparatus producing Langmuir-Blodgett films, such as described in EP 678 345; Dynamic Thin Laminar Flow (DTLF) described in WO 01/89716; etc. can each also be used to deposit or apply metallic catalytic nanoparticles directly onto the substrate 31. In a preferred embodiment the metallic catalyst is deposited or applied by MG1(monolayer generator 1). Nano droplets of catalytic metals can also be prepared by vacuum evaporation.

FIG. 1a illustrates an exploded view of the nanotube growing mat 30. A preferred means of retaining the nanotube growing mat 30, comprises a hermetic seal 29 formed between the porous substrate 31 and the retaining wall 28, while an electrical connection is made with the electrical electrodes 22. Various methods of holding the mat 30 and connecting it electrical are possible and would be understood by a person skilled in the art. The porous substrate 31 has pores 32 through which a carbon containing carrier gas passes. The substrate is typically a carbon paper having fibers with a diameter between 5 and 10 μm. The carbon paper substrate 31 has a high electrical resistance, and when the electric current is applied across the substrate, it quickly heats and attains a temperature about 700° C., at which nanotubes are known to be produced. The substrate 30 are preferably organized in a repeated pattern which facilitate the deposition of the nanoparticle catalyst.

The substrate 31 may also be a patterned carbon monolayer of nano- or microparticles. In a preferred embodiment, the carbon monolayer can also be mixed with non-carbon atoms to produce a hetero-substrate. These hetero-substrates contain carbon, as well as, non-carbon elements such as silicon, nitrogen, and phosphorus will also be incorporated into what will become heterogeneous nanotubes i.e. not solely carbon nanotubes. These heterogeneous substrate layers can, be placed in a multilayer configurations of carbon monolayer and carbon-silicon (C—Si) monolayers in an alternating pattern, and generate more complex heterogeneous nanotubes.

The carrier gas 21 includes a carbon containing gas, as well as an inert gas selected from helium, neon, argon, krypton, and xenon, and may include hydrogen. In a preferred embodiment the inert gas is argon. The carbon containing gas is carbon monoxide, methane, ethane, ethylene, a straight chain saturated or unsaturated hydrocarbon of up to 6 carbons, or branched chain saturated or unsaturated hydrocarbon of up to 6 carbons.

The opposite side of the nanotube growing mat 30 there is deposited an organized nanoparticle catalyst 34. The nanoparticle catalyst layer is deposited in a predetermined pattern. Metal catalysts, such as Fe, Co, Ni, Y or Mo have been used and reported. The catalyst is comprised of a metal and in a preferred embodiment is either Fe, Ni, Co, Y or Mo or alloys of these metals. A large number of catalyst elements and alloys of elements have been tested and it is noted that the results vary a great deal, even when the same elements are used. The quantity and quality of the nanotubes obtained depend on various parameters such as the metal concentration, inert gas pressure, kind of gas, the current and system geometry. Usually the diameter is in the range of 1.2 to 1.4 nm for a SWCNT. The catalyst is deposited in from a solution in which the carbon substrate is immersed. The substrate is heated to evaporate the water and decompose the anionic portion of the metal solution and thus produce a metal oxide on the substrate. The metal oxides are converted under reducing conditions, most commonly, at higher temperature and under a hydrogen atmosphere to obtain the sought metal catalyst.

When the electrodes are energized, the nanotube growing mat 30 is heated to a sufficient temperature to generate a reaction between the substrate 31, the catalyst 34 and the carbon containing carrier gas 21. This reaction produces nanotubes 40 on the surface of the substrate, organized in the form of the predetermined pattern of the nanoparticle catalyst. The temperature of activation is from 650 to 750° C. It is believed that an the activation produces an intermediate species which is a carbon rich/liquid metal thin film.

This carbon rich/liquid metal thin film produces physicochemical reactions and each nanoparticle spontaneously emerges from the thin film in a hexagonal close-compact bundle 42. Due to the predetermined pattern of the nanoparticle catalyst on the substrate, the pattern promotes the growth of nanotubes in an organized manner. The nature of the organized growth is a function of the pattern. The speed of growth of the bundle 42 will depend primarily on the concentration of carbon in the carrier gas 21, and the diffusion of the carbon fraction in the carrier gas 21 across the substrate 31. If the concentration of carbon at the carbon rich/liquid metal thin film is relatively constant the nanoparticle will grow continuously at a given rate. The direction of growth of the nanotubes will tend to be away from the surface of the mat 30 and in direction of the flow of the carrier gas 21. Merging and twisting several bundles 42 together, will produce a cable 50. In a preferred embodiment the bundles 42, or cables 50 are collected and wound with tension sensitive winding equipment so as to minimize breaking the nanotubes.

The produced nanotubes are gathered and withdrawn through a collection tube 46, found in a second compartment 14 of the vessel 10. Further processing of the produced nanotube can take place in a third compartment 16 or outside the vessel 10 entirely, and be spooled or collected. The vessel 10 has at least one but likely two gas outlets, 36 and 38. Various means of collecting or gathering the nanotube bundle 42 can be envisaged including: a mechanical gathering or grappling mechanism connected to the collection spool 52; and a negative pressure in the gas outlet 38 producing a driving force to draw the nanotube bundles 42 through the gathering tube 46 towards the collection spool 52. Continuous production requires the steady withdrawal of the nanotube bundle. Because of the bi-dimensional array of the catalyst particles, the produced nanotubes will tend to group to one another to form a bundle by Van der Waals forces. These nanotube bundles will tend to stay together. This bundle tends to grow continuously and spontaneously. The growing bundle follows the gas stream till the gathering tube 46 towards the collection spool. An anchorage device (not shown) may be used, for example a carbon rod. This rod can be used to collect and pull the group of bundles coming from the catalyst particles. The bundles can be attached to the rod for instance by the means of electrostatic forces. Smoothly, this rod will lead the bundles to the collection spool. From this linear continuous production of carbon nanotubes, different arrangements can be obtained to produce for example, filaments, threads, strings and cables, to name a few. Twisting, tangling and other configurations can also be envisaged with special physical properties for these assemblies. By changing the two dimensional organisation of the catalytic nanoparticles, the final nanotubes arrangements can be determined. For instance, by making a one dimensional array, we could obtain sheets of nanotubes. In the same manner, a circular array of catalytic particles can make tubular organisation of nanotubes assemblies with predetermined wall thickness, etc. In a preferred embodiment the gathering tube 46 has a receiving diameter for the nanotube bundles that is greater than the diameter of the tube. The collection spool 52 may be arranged to twist the nanotube bundles 42 into a nanotube cable 50.

The following list gives the definition of the terms used in the specification:

Nanotubes are a family of carbon tubes of single-walled nanotubes (SWNT) with different atomic organization and multi-walled nanotubes (MWNT);

nanotube filaments are nanotube bundles;

nanotube wires are nanotube bundles larger than nanotube filaments;

nanotube cables are nanotube bundles larger than nanotube wires; and nanotube sheets are sheets made of nanotubes stacked side-by-side in a plane.

The carbon rich/liquid metal thin film can be produced alternatively when an inert gas under pressure is passed through a tubular metal cathode while passing an electric current through the cathode to produce a plasma of fine catalyst particles which are deposited on a porous carbon substrate, while a carrier gas containing a carbon source is passed over the substrate to cause a reaction between the catalyst and the carbon source, which also results in the production of carbon nanotubes.

The apparatus above produces organized nanotubes with the following characteristics:

a range of diameter varying from 10 to 30 μm; and

Young's modulus (elastic modulus) of SWNTs lies close to 1 TPa. The maximum tensile strength is close to 30 GPa. Its is stronger than steel and could be used-in any projects where strength is required.

The nanotubes have the following thermal properties:

an unusually high value of 6600 W/m-k for the thermal conductivity at room temperature was measured. These values for thermal conductivity are comparable to that of diamond or a layer of graphite. However, the thermal conductivity drops dramatically down to around 3000 W/m-k when the temperature approaches 400 K. Since the graphite melting point is very high, these properties are very favourable to devices where heat is a problem; and the nanotubes have the following electrical properties;

the resistivity of SWNTs is in the order of $10^{-4}$-cm at 300 K, which would indicate that the tubes could be the most highly conductive carbon fibers known, with a current density in the tube greater than $10^7$ A/cm$^2$, and stable current densities of nanotubes could be pushed as high as 1013 A/cm$^2$. This means that electrical massive transportation with power line is quite possible, because of the combination of strength and super current properties.

In another embodiment, illustrated in FIG. 2, the carbon mat 60 can be disposed in a retaining wall 128 and sealed with an element 129 and connected electrically to electrodes 122. Here the carbon substrate 61 need not be porous but must have a predetermined nanoparticle catalyst layer 34 deposited on the side in contact with the carrier gas 21. Here too the substrate 61 and the catalyst 34 make up a nanoparticle growing mat 60. The carrier gas 21 flows over the mat 60 and due to the flow of the carrier gas 21, the nanotubes collected are produced at an angle. To facilitate gathering the nanotube bundles 42, the gathering tube 156 is angled and opens towards the mat 60. Once again with the electrodes 122 energized the mat 60 heats up quickly to the temperature required for the production of nanotubes, which due to the predetermined pattern of the catalyst 34 produces nanotubes that are organized according to the pattern.

The embodiment(s) of the invention described above is (are) intended to be exemplary only. The scope of the invention is therefore intended to be limited solely by the scope of the appended claims.

The invention claimed is:

1. A method of manufacturing a nanotube growing mat comprising:
   providing a substrate comprising a uniform supporting layer and carbon;
   applying nanosized catalytic particles in a bi-dimensionally organized monolayer on the uniform supporting layer in a predetermined pattern, the pattern promoting growth in an organized manner from the catalytic particles as a function of the pattern.

2. The method of claim 1, wherein the substrate is porous.

3. The method of claim 1, wherein the uniform supporting layer comprises a patterned monolayer of carbon nano- or micro-particles.

4. The method of claim 3, wherein the substrate comprises non-carbon elements selected from the group consisting of Si, N, and P, to produce a hetero-substrate.

5. The method of claim 4, wherein the hetero-substrate contains Si which is incorporated into the nanotube produced on the mat and produces a hetero-nanotube with carbon and silicon.

6. The method of claim 4, wherein the substrate and the hetero-substrate are placed in a multilayer configuration.

7. The method of claim 6, wherein the multilayer configuration produces a complex nanotube comprising carbon and silicon in alternating layers.

8. The method of claim 1, wherein the catalytic particles are a metal.

9. The method of claim 8, wherein the catalytic particles are deposited in a monolayer.

10. The method of claim 8, wherein the metal is selected from the group consisting of Fe, Co, Ni, Y, Mo and their alloys.

11. The method of claim 10, wherein the nanosized catalytic particles are applied by an application method selected from the group consisting of transmission electron microscopy, monolayer generator 1 method, Langmuir-Blodgett, apparatus producing Langmuir-Blodgett films and Dynamic Thin Laminar Flow.

12. The method of claim 11, wherein the application method is the monolayer generator 1 method.

13. The method of claim 12, wherein the uniform supporting layer comprises a patterned monolayer of carbon nano- or micro-particles.

14. The method of claim 13, wherein the substrate comprises non-carbon elements selected from the group consisting of Si, N, and P, to produce a hetero-substrate.

15. The method of claim 14, wherein the hetero-substrate contains Si which is incorporated into the nanotube produced on the mat and produces a hetero-nanotube with carbon and silicon.

16. The method of claim 14, wherein the substrate and the hetero-substrate are placed in a multilayer configuration.

17. The method of claim 16, wherein the multilayer configuration produces a complex nanotube comprising carbon and silicon in alternating layers.

18. A method of producing organized nanotubes comprising:
    preparing a nanotube growing mat comprising:
        a substrate comprising a uniform supporting layer and carbon; and
        nanosized catalytic particles in a bi-dimensionally organized mononolayer on the substrate, wherein the catalytic particles are applied in a predetermined pattern on the uniform supporting layer, the pattern promoting growth of nanotubes in an organized manner which is a function of the pattern;
    activating the mat; and
    flowing a carrier gas in a direction whereby the nanotubes are produced from the mat on a continuous basis.

19. The method of claim 18, wherein the substrate is porous.

20. The method of claim 18, wherein activating the mat is achieved by applying an electric current across the mat.

21. The method of claim 18, wherein the nanotubes are gathered and drawn away from the mat by an anchorage device or a negative pressure.

22. The method of claim 21, wherein the nanotubes are gathered by a negative pressure.

23. The method of claim 18, wherein the catalytic particles are a metal.

24. The method of claim 23, wherein the metal is selected from the group consisting of Fe, Co, Ni, Y, Mo and their alloys.

25. The method of claim 18, wherein the carrier gas comprises a carbon source, a hydrogen source and an inert gas.

26. The method of claim 25, wherein the inert gas is selected from the group consisting of He, Ne, Ar, Kr, and Xe.

27. The method of claim 26, wherein the inert gas is Ar.

28. A nanotube growing mat comprising:
    a substrate comprising a uniform supporting layer and carbon;
    nanosized catalytic particles, wherein a set is applied in a bi-dimensionally organized monolayer on the substrate in a predetermined pattern which promotes growth of nanotubes from the catalytic particles as a function of the pattern.

29. The mat of claim 28, comprising an electrical connection.

30. The mat of claim 28, wherein the substrate is porous.

31. The mat of claim 28, wherein the nanotubes are gathered by a negative pressure.

32. The mat according to claim 28, wherein the catalytic particles are a metal.

33. The mat according to claim 32, wherein the metal is selected from the group consisting of Fe, Co, Ni, Y, Mo and their alloys.

34. The mat according to claim 28, wherein the uniform supporting layer comprises a patterned monolayer of carbon nano- or micro-particles.

35. The mat of claim 34, wherein the carbon substrate comprises non-carbon elements selected from the group consisting of Si, N, and P, to produce a hetero-substrate.

36. The mat of claim 35, wherein carbon substrate and the hetero-substrate are placed in a multilayer configuration.

37. The mat of claim 36, wherein the hetero-substrate contains Si which is incorporated into the nanotube produced on the mat and produces a hetero-nanotube with carbon and silicon.

38. The mat of claim 36, wherein the multilayer configuration produces a complex nanotube comprising carbon and silicon in alternating layers.

* * * * *